United States Patent
Sørensen

(10) Patent No.: US 9,870,783 B2
(45) Date of Patent: Jan. 16, 2018

(54) AUDIO SIGNAL PROCESSING

(71) Applicant: Microsoft Technology Licensing, LLC, Redmond, WA (US)

(72) Inventor: Karsten V. Sørensen, Stockholm (SE)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/012,385

(22) Filed: Feb. 1, 2016

(65) Prior Publication Data

US 2017/0103774 A1    Apr. 13, 2017

(51) Int. Cl.
| | |
|---|---|
| G10L 21/02 | (2013.01) |
| G10L 21/0364 | (2013.01) |
| G10L 21/0232 | (2013.01) |
| G10L 21/034 | (2013.01) |
| H04M 9/08 | (2006.01) |
| G10L 21/0208 | (2013.01) |

(52) U.S. Cl.
CPC ...... G10L 21/0364 (2013.01); G10L 21/0232 (2013.01); G10L 21/034 (2013.01); H04M 9/082 (2013.01); G10L 2021/02082 (2013.01)

(58) Field of Classification Search
CPC ............. G10L 21/0208; G10L 21/0232; G10L 2021/02082; H04M 9/082; H04M 1/60; H04M 9/08; H04R 3/005; H04R 2410/01; H04R 3/002; G01S 3/803; G01S 3/8036; G10K 11/002; G10K 2210/506
USPC .......... 704/226–228, 225, 233; 381/66, 94.1, 381/94.2, 94.3, 318, 320, 349, 91, 92, 93, 381/95, 96
See application file for complete search history.

(56) References Cited

U.S. PATENT DOCUMENTS

| | | |
|---|---|---|
| 5,729,614 A | 3/1998 | Nagata et al. |
| 6,295,364 B1 | 9/2001 | Finn et al. |

(Continued)

FOREIGN PATENT DOCUMENTS

| | | |
|---|---|---|
| WO | 2008122930 A1 | 10/2008 |
| WO | 2014046923 A1 | 3/2014 |

OTHER PUBLICATIONS

"International Search Report and Written Opinion Issued in PCT Application No. PCT/US2016/054574", dated Dec. 2, 2016, 11 Pages.

(Continued)

*Primary Examiner* — Vijay B Chawan

(57) ABSTRACT

An estimated system gain spectrum of an acoustic system is generated, and updated in real-time to respond to changes in the acoustic system. Peak gains in the estimated system gain spectrum are tracked as the estimated system gain spectrum is updated. Based on the tracking, at least one frequency at which the estimated system gain spectrum is currently exhibiting a peak gain is identified. Based on the identification of the at least one frequency, an audio equalizer is controlled to apply, to a first speech containing signal to be played out via an audio output device of the audio device and/or to a second speech containing signal received via an audio input device of the audio device, an equalization filter to reduce the level of that signal at the identified frequency. The equalization filter is applied continuously throughout intervals of both speech activity and speech inactivity in that signal.

20 Claims, 5 Drawing Sheets

(56) References Cited

U.S. PATENT DOCUMENTS

| | | | |
|---|---|---|---|
| 7,054,451 B2 | 5/2006 | Janse et al. | |
| 7,903,137 B2 | 3/2011 | Oxford et al. | |
| 8,280,076 B2 | 10/2012 | Devantier et al. | |
| 8,804,981 B2* | 8/2014 | Sorensen | G10L 21/0208 381/91 |
| 8,996,365 B2 | 3/2015 | Yamaguchi | |
| 9,042,584 B2* | 5/2015 | Kwon | H04R 25/453 381/318 |
| 2002/0070573 A1* | 6/2002 | Song | B60P 3/40 296/37.6 |
| 2002/0071573 A1* | 6/2002 | Finn | G10L 21/0208 381/93 |
| 2006/0140392 A1 | 6/2006 | Ahmadi | |
| 2008/0085009 A1* | 4/2008 | Merks | H04M 9/082 381/66 |
| 2010/0166200 A1 | 7/2010 | Truong et al. | |
| 2011/0206212 A1* | 8/2011 | Derkx | H04R 3/005 381/66 |
| 2012/0207327 A1* | 8/2012 | Sorensen | G10L 21/0208 381/94.3 |
| 2013/0128701 A1* | 5/2013 | Derkx | G01S 3/8036 367/129 |
| 2015/0003658 A1* | 1/2015 | Sato | H04R 1/025 381/349 |
| 2015/0030180 A1 | 1/2015 | Sun et al. | |

OTHER PUBLICATIONS

Gonzalez, et al., "An Automatic Maximum Gain Normalization Technique with Applications to Audio Mixing", In Proceedings of 124th Convention Paper of Audio Engineering Society, May 17, 2008, pp. 1-8.

Lee, et al., "Low-Complexity Howling Detection based on Statistical Analysis of Temporal Spectra", In International Journal of Multimedia and Ubiquitous Engineering, vol. 8, No. 5, Sep. 30, 2013, pp. 83-92.

"Second Written Opinion Issued in PCT Application No. PCT/US2016/054574", dated Sep. 13, 2017, 4 pages.

* cited by examiner

AUDIO SIGNAL PROCESSING

RELATED APPLICATION

This application claims priority under 35 U.S.C. §119(b) to GB Application No. 1518004.5 titled "System Gain Equalization Filtering" and filed on Oct. 12, 2015, the entire disclosure of which is incorporated by reference herein.

BACKGROUND

Communication systems allow users to communicate with each other over a network. The network may be, for example, the Internet or public switched telephone network (PSTN). Audio signals can be transmitted between nodes of the network, to thereby allow users to transmit and receive audio data (such as speech data) to each other in a communication session over the communication system.

A user device may have an audio output device such a speaker or set of speakers for outputting audio signals to near end user. The user may enter into a communication session with another user, such as a private call (with just two users in the call) or a conference call (with more than two users in the call). The audio signals may be received over the network from a far end user during a call. The user device may also have audio an input device such as a microphone or array of microphones that can be used to receive audio signals such as speech from a user. The user's speech is received at the microphone, processed and is then transmitted over a network to the other users in the call.

As well as the audio signals from the user, the microphone may also receive other audio signals, such as background noise and echo, which are unwanted and which may disturb the audio signals received from the user. For example, in a call, the near end user's microphone signal received at the far end device via the network may be outputted via the far end user's loudspeakers. This is turn may be picked up by the far end microphone, and transmitted back to the near end device, so that the near end user's own microphone signal is played out of their loudspeakers. This is an example of an acoustic loop, which can lead to acoustic feedback when the system gain is high. Acoustic loops, whereby a microphone signal is outputted by a loudspeaker in the vicinity of the microphone itself, and received by the microphone, can arise in other contexts, such as an acoustic system with a single audio device. That is, other types of acoustic system are prone to acoustic feedback also.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various aspects of the present subject matter are directed to reducing acoustic feedback in an acoustic system comprising at least one audio device.

An estimated system gain spectrum of the acoustic system is generated, and updated in real-time to respond to changes in the acoustic system. Peak gains in the estimated system gain spectrum are tracked as the estimated system gain spectrum is updated in real-time. Based on the tracking, at least one frequency at which the estimated system gain spectrum is currently exhibiting a peak gain is identified. Based on the identification of the at least one frequency, an audio equalizer is controlled to apply, to a first speech containing signal (i.e. a first audio signal having a speech component) to be played out via an audio output device of the audio device and/or to a second speech containing signal (i.e. a second audio signal having a speech component) received via an audio input device of the audio device, an equalization filter to reduce the level of the speech containing signal at the identified frequency, i.e. in a portion of the spectrum of that signal that includes the identified frequency. The equalization filter is applied continuously throughout intervals of both speech activity and speech inactivity in the speech containing signal.

BRIEF DESCRIPTION OF FIGURES

For a better understanding of the present subject matter and to show how the same may be carried into effect, reference will now be made by way of example to the accompanying drawings, in which.

DETAILED DESCRIPTION OF EMBODIMENTS

An effect that can arise in an acoustic system is "howling". Howling arises from acoustic feedback in the system. It can be caused by a number of factors and arises when system gain is high.

In the following described embodiments of the subject matter, a technique is described, in which an estimate of the system gain spectrum is updated in real time. A number N (one or more) of peaks in the system gain spectrum are tracked in real time, and the tracking is used to adapt that number N of equalization filters in real time. Each of the N equalization filters is applied by a respective audio equalizer, to reduce the level of at least one speech containing signal in parts of the spectrum where the system gain is high. That is, at a respective frequency matching the current frequency of a respective one of the N peaks. As one of the N peaks moves in the frequency spectrum, or becomes superseded by a new higher peak, the corresponding equalizer filter is adapted in real time accordingly to accommodate the movement or the new peak.

A speech containing signal means an audio having a speech component during at least some intervals (speech intervals of the audio signal). Note, the term "speech signal" is used herein as shorthand for "speech containing signal". That is, the terms are equivalent.

In other words, the equalizers are applied specifically to reduce the peaks of the system gain spectrum: it is the parts of the spectrum with the highest gain that will determine the robustness to howling of a certain combination of endpoints, so it is those spectral regions that are identified and directly targeted. The aim of the described embodiments is not one of completely flattening the gain spectrum, as this may lead to artificial sounding audio —the level of the speech signal across its spectrum is changed as little as possible, i.e. only enough as is needed to provide robustness to howling, as this can improve perceptual quality.

Figure 4:
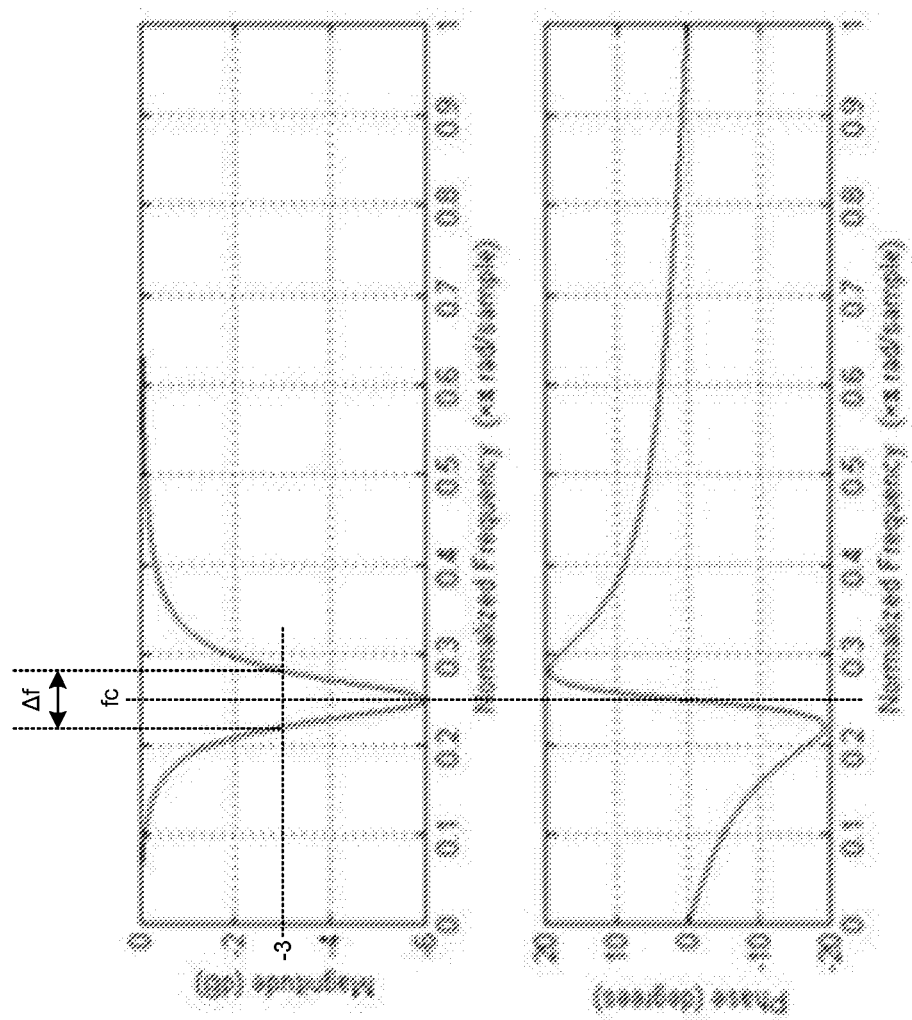
FIG. 4A is a graph of an equalizer filter gain over a range of frequencies.
FIG. 4B is a graph of an equalizer filter phase shift over a range of frequencies.

In applying equalization filters for this particular purpose, the most critical frequencies of the spectrum, corresponding to the highest peaks, are identified and equalization filters applied with a spectral gain dip at those frequencies. An example of a suitable equalizer filter is shown in FIG. 4A, with a dip at frequency fc which matches the frequency of one of the N peaks in the gain spectrum. The width of each dip (Δf, FIG. 4) is also determined from the system gain spectrum. Multiple equalizers may be cascaded, such that any desired number of such filters can be applied that will each take care of one of that same number of peaks in the system gain spectrum. No part of the spectrum is amplified by the equalizers —each equalizer only attenuates the signal to which it is applied, to reduce its level. Each dip is only as deep and as wide as is needed to provide the robustness to howling so as to minimize the perceived impact on the signal. The depth and/or the width of each peak is adapted in real time as appropriate, to accommodate changes in the estimated system gain spectrum.

Previous solutions to the issue of howling include adjusting the aggressiveness of a noise suppression method that is applied to an audio signal in each frequency band. In this method, a variable gain is applied in each frequency band to reduce a noise component in the signal relative to a speech component. The variable gain in each band is lower limited, and its respective lower limited is adjusted based on the estimated system gain to prevent howling. This has the effect of lowering the system gain in bands prone to howling, but only during intervals of speech inactivity in the signal within each band; during intervals of speech activity within each band, the system gain estimate has no effect on the noise suppression as the gains are above their respective lower limits.

By contrast, herein the equalization filter(s) is applied in a signal chain of an acoustic system to at least one speech signal continuously throughout intervals of both speech activity and speech inactivity in that speech signal. Also, while the noise reduction approach operates with a frequency resolution matching the frequency bands, the equalization filters can also be designed with a dip gain center frequency placed in-between spectral bins, and/or have an arbitrarily narrow or broad spectral gain dip.

The at least one speech containing signal to which the equalization filter(s) is applied may be a speech containing signal to be played out via an audio output device of the acoustic system and/or a speech containing signal received via an audio input device of the acoustic system.

The equalizer(s) that apply the equalization filter(s) are dedicated equalizer(s) i.e. dedicated to reducing acoustic feedback in the acoustic system, so as to provide robustness to howling in the acoustic system, in contrast to techniques which incorporate howling robustness techniques into some other signal processing applied in the signal chain, such as noise cancellation. The equalization filter(s) is applied independently from any noise cancellation (any noise suppression and/or any noise cancellation) applied in the signal chain and/or the acoustic system, to either or both of those speech containing signals; that is separately from any noise cancellation applied to either or both of those speech containing signals (whichever one of both the equalization filter(s) is applied to), anywhere else in the signal chain and/or the acoustic system.

Where noise suppression is applied to either or both of the speech containing signals, it may be applied independently of the estimated system gain spectrum e.g. if noise suppression is applied to the speech signal, a constant lower gain limit may be used in each frequency band that has no dependence on the estimated system gain spectrum. That is, relying on the equalization filter(s) rather than any noise cancellation to provide robustness to howling.

Other existing systems run single-sided measurements of each device, and equalize the playout based on an offline, pre-measurement of an impulse response, and thus cannot respond to changes in an acoustic system account for changes. Moreover, these may not take into account the impulse response of the room (where changes may occur, e.g. due to a portable audio device being moved), or the impulse response of the microphone, or take into account if any shaping is done in the driver, that differs from when the device characteristics were being measured.

Others alternative solutions may rely on a more computationally expensive linear filter based echo canceller to constantly subtract an estimate of the howling from the microphone signal. This approach is mostly suited for high-end devices with fast CPUs and without too much non-linear distortion from the loudspeaker and microphone.

Before describing the particular embodiments of the present subject matter, a context in which the subject matter can usefully be applied will now be described with reference to FIG. 1, which illustrates a communication system 100.

A first user 102 of the communication system (User A/near end user) operates a user device 104. The user device 104 is a computer device, which may for example may be a desktop or laptop computer device, mobile phone (e.g. smartphone), tablet computing device, wearable computing device (headset, smartwatch etc.), television (e.g. smart TV) or other wall-mounted device (e.g. a video conferencing device), set-top box, gaming console etc.

The user device 104 comprises a processor 108, formed of one or more processing units (e.g. central processing unit (CPU)), such as a single or multi-core processor. The processor 108 is configured to execute code such as a communication client 109 for communicating over the communication system 100. The client 109 may for be a stand-alone communication client application that runs directly on the processor 108, or plugin to another application such as a Web browser etc. that is run on the processor 108 in an execution environment provided by the other application.

The code 109 allows the user device 104 to engage in calls and other communication sessions (e.g. instant messaging communication sessions) over the communication system 100. The user device 104 can communicate over the communication system 100 via a network 106, which may be, for example, the Internet or other packet-based network, or the Public Switched Telephone Network ss (PSTN). The user device 104 can transmit data to, and receive data from, the network 106 over the link 110.

Figure 1:
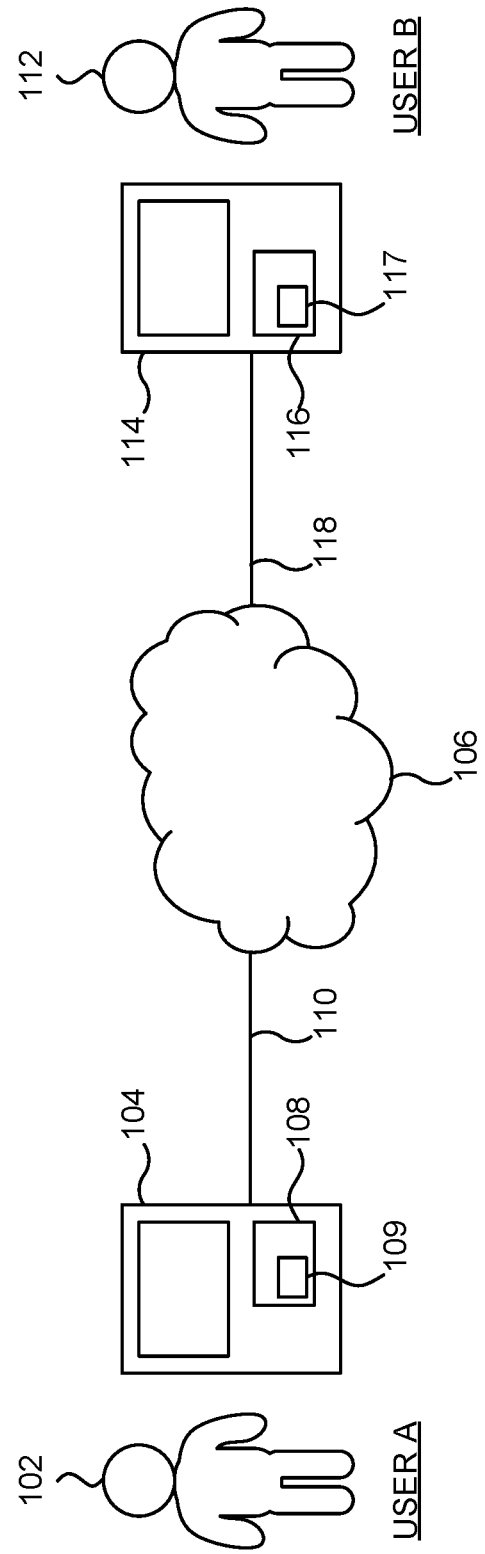
FIG. 1 is a schematic diagram of a communication system.

FIG. 1 also shows a remote node with which the user device 104 can communicate over the communication system 100. In the example shown in FIG. 1, the remote node is a second user device 114 which is usable by a second user 112 (User B/"far end" user) and which comprises a processor 116 which can execute code (e.g. a communication client) in order to communicate over the communication network 106 in the same way that the user device 104 communicates over the communications network 106 in the communication system 100. a desktop or laptop computer device, mobile phone (e.g. smartphone), tablet computing device, wearable computing device (headset, smartwatch etc.), television (e.g. smart TV) or other wall-mounted device (e.g. a video conferencing device), set-top box, gaming console etc.

The user device 114 can transmit data to, and receive data from, the network 106 over the link 118. Therefore User A 102 and User B 112 can communicate with each other audibly over the communications network 106, whereby the user devices 104, 112 and their surroundings constitute an acoustic system.

Figure 2:
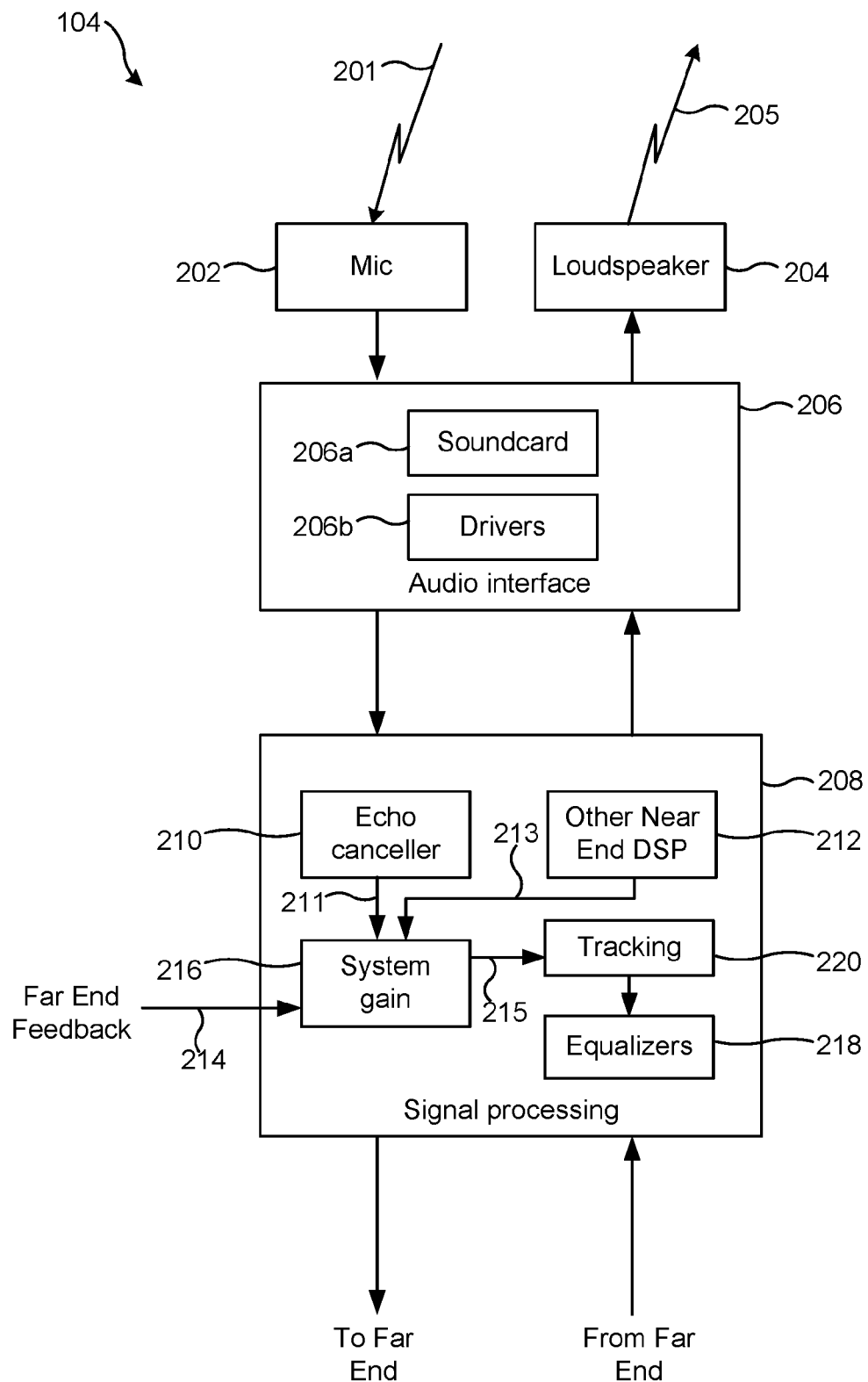
FIG. 2 is a block diagram of a user device.

FIG. 2 illustrates the user device 104 at the near end speaker in more detail. In particular, FIG. 2 illustrates a microphone 202 receiving a speech signal 201 from the user 102. The microphone 202 can be a single microphone or a microphone array comprising a plurality of microphones and optionally including a beamformer. As is known, a beamformer receives audio signals from the microphones in a microphone array and processes them in an attempt to improve the signal in a wanted direction in comparison to signals perceived to be coming from unwanted directions. This involves applying a higher gain in a desired direction.

Signals from the microphone 202 (whether with or without a beamformer) are applied to a signal processing stage 208, via an audio interface 206 of the device 104. The signal processing stage 208 includes a plurality of signal processing blocks, each of which can be implemented in hardware or software or a combination thereof as is deemed appropriate. The blocks can include, for example, an echo canceller block 210, an equalizer block 218, and one or more other signal processing blocks, such as digital signal processing (DSP) block(s) 212, for example a digital gain block or background noise attenuation block, such as noise suppression or noise cancellation. Blocks 201, 212, 216 and 218 (see below) represent functionality implemented by the client software 109 when executed on the processor 108 in this example.

After signal processing, the signals input by the user 102 and picked up by the microphone 202 are transmitted for communicating with the far end user 112.

At least one loudspeaker 204 is provided to provide audio signals 205 intended for the user 102. Such signals can come from the far end user 112 to be output to the user 102. The audio signals 205 can be processed before being emitted by the loudspeaker by signal processing logic (e.g. circuitry and/or software processing) and for the sake of convenience the loudspeaker is shown connected to signal processing stage 208 via the audio interface 206 in FIG. 2.

The audio interface 206 represents the hardware, such as a soundcard 206a, and software of the user device 104, such as sound card drivers 206b executed on the processor 108, that cooperate to allow the microphone 202 and loudspeaker 204 to perform their described functions. In some case the soundcard 206a and/or drivers 206b may perform additional signal processing, such as equalization or dynamic range compression, which may be outside of the control of the client 109.

The signal processing stage 208 further includes a system gain estimation block 216. As discussed in more detail later, block 216 estimates a system gain spectrum 215 of the acoustic system. The system gain spectrum 215 denotes an estimate of the system gain as a function of frequency (as a discrete or continuous function). That is, the estimated system gains at different frequencies. For a discrete function, a respective estimated system gain is generated for each of a plurality of frequency bands in an audio spectrum; for a continuous function, the system gain is estimated as a continuous function over the audio spectrum.

Real time tracking of changes in the system gain for different frequencies is used to continuously adjust the tuning of the equalization block 218. This tracking functionality is represented by tracking block 220 of the signal processing stage 208, and is described in further detail below.

Howling is a symptom of having feedback with a system gain higher than 1 somewhere in the frequency spectrum. By reducing the system gain at frequencies at or near this limit, howling can be stopped or prevented.

Sometimes a resonating frequency in the loudspeaker, microphone or physical echo path will be much larger than average and will be what is limiting the robustness to howling. Resonance can also occur elsewhere in the signal processing chain, for example in DSP block(s) 208, in the audio interface 206 (particularly in low cost soundcards), or at the far end, e.g. in the far end echo path or far end device 114.

The system gain is estimated by taking into consideration the blocks involved in system processing (including the echo canceller 210 and other DSP block(s) 212 when present), and in particular, uses information from the echo path estimated in the echo canceller block 210 which provides information about the room in which the near end device 104 is located. The shape of the spectrum is usually dominated by the echo path, as the transfer function of the echo path includes the transfer function of the loudspeaker where resonating frequencies often occur. In FIG. 2, the estimated echo path is denoted by arrow 211, and is in the form of a model of the echo path.

The system gain spectrum can either be single-sided, or can take into account all other endpoints as well, such as the far end device 114, using a feedback mechanism whereby information 214 about acoustic conditions and/or signal processing at the far end device is received via the network 106 (far-end feedback).

The acoustic echo canceller generates an estimate of its echo path, in the form of an estimated echo path magnitude spectrum 211, which is a gain spectrum of the echo path of the echo canceller 210. That is, the gain of the echo path of the echo canceller 210 as a function of frequency. The echo path estimate is generated by comparing a reference signal to the signal to which the echo cancellation is to be applied. The term "echo path" when applied to an echo canceller means the signal path from the point in a signal chain at which the echo canceller takes its reference signal to the point at which it applies echo cancellation in the signal chain (see below). This includes the "physical echo path", i.e. the acoustic channel (acoustic path) from the loudspeaker 204 to microphone 202, and signal processing applied in the echo path.

Figure 3:
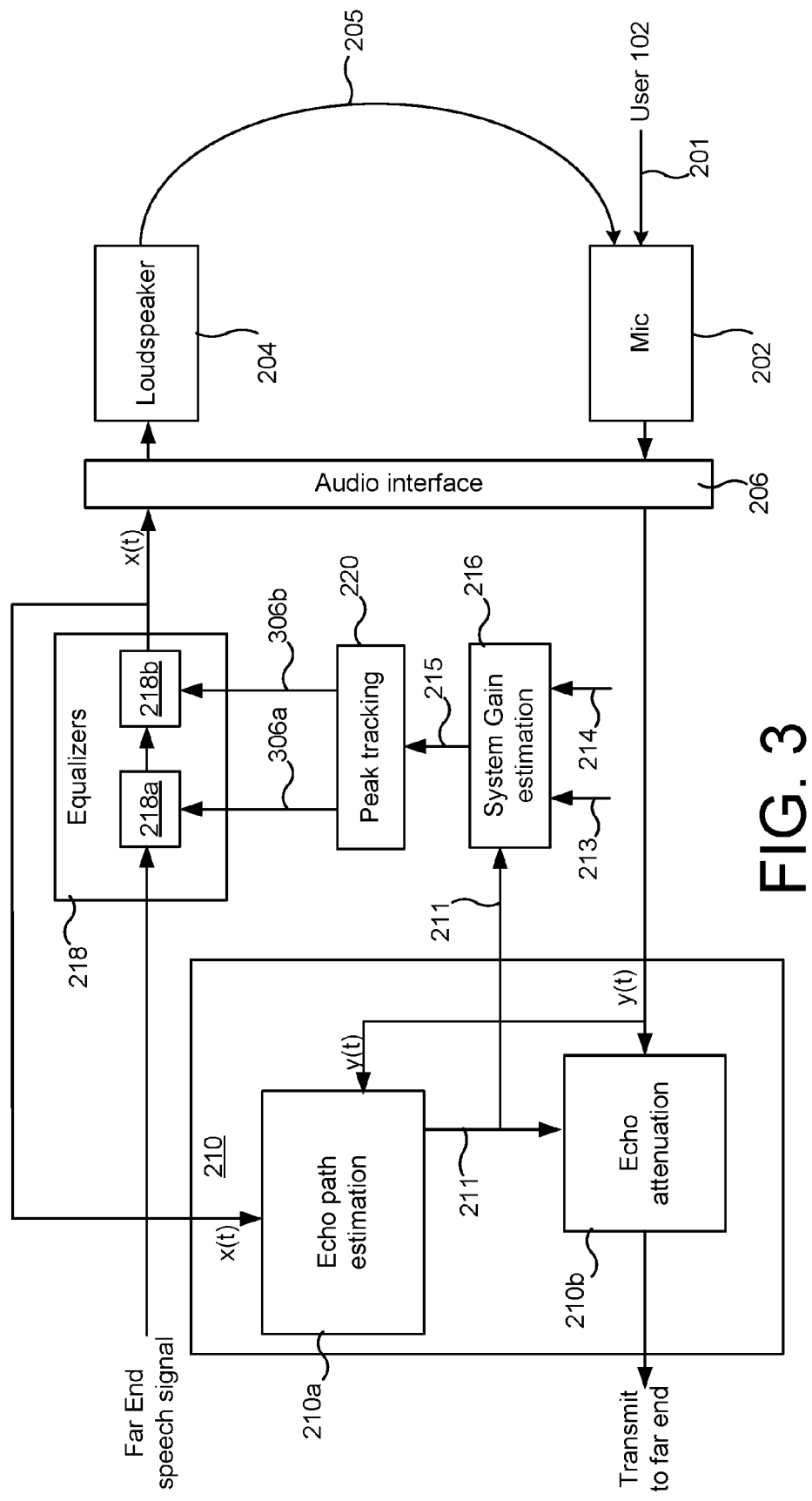
FIG. 3 is a schematic function diagram of a signal equalization process.

The estimated system gain spectrum 215 is generated by combining the estimated echo path magnitude spectrum 211 with magnitude spectra, modelling all other digital scaling or shaping performed in the client 109 by DSP block(s) 212, denoted by arrow 213 in FIGS. 2 and 3. The far-end feedback 214 is also accounted for in the system gain estimate 215 when received. The far-end feedback 214 may for example comprise a local system gain spectrum of the far end system, which models the effect of the far-end signal processing performed at the far-end device 114. A component of the far end system gain spectrum may also model a contribution from the far end echo path.

The echo path of the acoustic echo canceller 210 may include the audio interface 206, such that audio signal processing applied by the audio interface 206 is accounted for in the estimated echo path 211, as in the examples described below. In this case, the audio interface processing is included in the estimated gain spectrum 211 "automatically" as a component of the echo estimated path 211.

In other cases, the audio interface 206 may not be included in the echo path. For example, where a so-called "loopback" signal conveying the output of the audio interface 206 is available from the audio interface 206, the echo path may be estimated using the loopback as a reference so as to exclude processing of signals supplied to the loudspeaker 204 in the audio interface 206. The availability of a loopback signal may depend on the operating system of the device 104. In this case, the magnitude spectrum of the audio interface 206 may be computed and combined with the echo path estimate 211, client transfer function 213 and (where applicable) far-end feedback 214, to include processing by the audio interface 206 in the estimated system gain spectrum 215 explicitly.

When conducting hands-free calls between two or more devices, the risk of howling depends (among other things) on the gain of the system and the performance of the echo cancellers applied on each endpoint. The gain of the system is often frequency dependent, due to non-flat spectral shape of the electro-acoustic units and of the echo paths. In the worst case, resonating frequencies coincide between the two endpoints, and as a result howling easily builds up whenever the echo cancellers are not perfectly cancelling the echoes.

The issue can be more pronounced for suppression based linear echo cancellers, which also happens to be the otherwise best suited AEC (Acoustic Echo Cancellation) design for a low-end device. Howling can be heard as noise that builds up to speech levels. It is often narrow-banded, but can also be more broad-banded. It all depends on the system gain spectrum, and the type of echo cancellers applied.

FIG. 3 shows a function block diagram, in which functional blocks represent functionality implemented by the near end user device 104 to reduce acoustic feedback, and thereby prevent howling. FIG. 3 shows the echo canceller block 210, equalizer block 218, system gain estimation block 216 and peak tracking block 220 connected in an exemplary signal processing chain, for the purposes of illustration.

The reference audio signal used by the acoustic echo canceller 210 is a first speech containing signal, denoted x(t), which is a speech containing signal received from the far end device 114 via the network 106, which is outputted via the near end loudspeaker 204 (far end speech signal). In particular, the signal x(t) is a version of the far end speech signal to which one or more equalization filters have been applied by the equalizer block 218 (as described below), but which has not been supplied to the audio interface 206. That is, the reference signal x(t) is taken at a point in the signal chain after the equalizer block 218 but before any processing by the audio interface 206.

After equalization, the far end speech signal x(t) is supplied to the audio interface 206 for outputting via the loudspeaker 204. The resulting output from the loudspeaker 204 is denoted by the arrow labelled 205.

The acoustic echo canceller 210 also receives a microphone signal captured by the near end microphone 202, denoted y(t). The echo canceller 210 applied an echo cancellation process to the microphone signal y(t), based on the reference x(t). The signals x(t) and y(t) are digital audio signals, formed of a plurality of digital samples.

The microphone signal y(t) has an echo component caused by the microphone 202 picking up part of the loudspeaker output 205. During intervals of near end speech activity (i.e. when the near end user 102 is speaking), the microphone signal y(t) also has a speech component, i.e. the user's speech signal 201. The microphone signal y(t) is received by an echo attenuation block 210b of the echo canceller 201, via the audio interface 206.

The acoustic path from the loudspeaker 204 to the microphone 202, plus the portions of the signal chain from the point in the signal chain at which the reference signal x(t) is taken by the echo canceller 210 to the point in the signal chain at which the microphone signal y(t) is received by the echo canceller 210, constitute the echo path of the echo canceller 210.

An echo path estimation block 210a of the echo canceller 210 compares the received microphone signal y(t) with the reference signal x(t) in order to generate the estimate of the echo path 211. The echo path estimate 211 models the acoustic path from the loudspeaker 204 to the microphone 202 plus any signal processing applied in the echo path, for example by the audio interface 206, to the far end speech signal x(t) and/or the near end microphone signal y(t).

An echo attenuator block 210b of the echo canceller 210 applies echo attenuation to the microphone signal y(t) based on the echo path estimate 211. This reduces the level of the echo component in the microphone signal y(t) relative to the speech component therein. For example, the echo attenuator block 210b may apply echo subtraction, echo suppression or a combination of both. As is known in the art, echo subtraction refers to a form of echo cancellation where the echo path estimate 211 is used to generate an estimate of the echo component that is subtracted from the microphone signal y(t). Echo suppression refers to a form of echo cancellation, in which the echo path estimate 211 is used to determine respective gains in different frequency bands that are applied to the microphone signal y(t) to attenuate the echo component relative to the speech component.

The microphone signal y(t), to which the echo cancellation has been applied, is transmitted to the far end device 114 via the network 106. In some cases, it may be subject to additional processing by the near end client 109 such as noise suppression, digital gain and/or packetization.

The system gain estimation block 218 combines the echo path estimate 211, the local client magnitude response(s) 213 and far-end feedback 214 to estimate the system gain spectrum 215 in the manner described above. During a call between the near end user 102 and the far end user 112 the system gain estimation block 216 continuously updates the estimated system gain spectrum 215 in real time.

Theoretically, a perfect echo canceller would eliminate the echo component from the microphone signal y(t) entirely. Thus, theoretically, echo cancellation at both the near and far ends could prevent howling in itself. However, in practice, imperfections in the echo cancellation process, caused for example by non-linarites in the echo path, leave some residual echo in y(t). Indeed, an "imperfect" echo canceller may be desirable sometimes, as it uses fewer processing resources, or because overly-aggressive echo cancellation can cause a reduction in perceptual quality.

Thus, due to imperfections, even with the echo canceller 210 and similar echo cancellation at the far end, a system may in some circumstances still be prone to howling. In particular, in a call between the near end user 102 and the far end user 112, residual echo transmitted to the far end may be outputted by the far end loudspeaker, picked up by the far end microphone, and transmitted back to the near end device 104 for outputting via the loudspeaker 204, potentially causing howling.

In order to prevent residual echo in the microphone signal y(t) causing howling, the peak tracking block 220 tracks in real time a number N of the highest peaks (local maxima) in the system gain spectrum 215 as it is updated in real time, and the equalizer block 218 applies N equalizer filters, each having a gain dip centred at a different one of those N peaks.

Here, the intention is not one of completely flattening the spectrum. As the spectrum contains the contribution from the echo path between the loudspeaker(s) to the microphone and includes the effect of the microphone, flattening the spectrum completely would not necessarily make the shaping of the spectrum flat at the ears of the listener, potentially leading to an unnatural sound and thus a decrease in perceptual quality.

Accordingly, during intervals in which the equalization is applied, only the N (≥1) most dominating (i.e. the N highest) peaks are suppressed, by applying N equalizer dips at the corresponding frequencies respectively, to reduce the impact on the signal. Each gain dip is only as deep and as wide as is necessary to prevent howling. That is, the signal is modified as little as possible by the equalizers.

The number N (that is, the number of equalizer dips applied to the signal) may be determined dynamically, so that only those peaks that are high enough to risk howling are attenuated. For example, any peaks above a gain threshold may be identified and only those peaks attenuated. For as long as there are no gain peaks above the threshold, no equalization is applied.

Where a gain threshold is used, in some cases the level of each peak above the gain threshold is reduced to a level that substantially matches (i.e. that matches or approximately matches) the gain threshold.

As another example, the level of the N highest peaks may be reduced to a level that substantially matches the level of the N+1th highest peak, so that the N+1 highest peaks have substantially the same level once the equalization has been applied.

Each equalizer filter may for example be a bi-quad filter having a transfer function as defined in equation 1:

$$H(z) = \frac{b0 + b1*z^{-1} + b2*z^{-2}}{1 + a1*z^{-1} + a2*z^{-2}}$$

To handle multiple peaks (N>1), N such equalizers are cascaded until a sufficient number of system gain peaks have been suppressed. That is, N such equalizers can be applied to x(t) in series. The term "z" in equation 1 is defined as:

$$z = r*\exp(j*\omega),$$

That is, H(z) describes the system in the frequency domain.

Here, b0, b1, b2, a2 and a3 are parameters of the transfer function for the bi-quad filter. That is, each equalization filter is defined by a set of five equalizer filter coefficients —so 5N equalizer coefficients in total. The filter coefficients of each equalizer filter is generated based on the tracking block 220, and updated in real time as the system gain spectrum 215 changes, e.g. as the N peaks move across the frequency spectrum or become superseded by other peaks of increasing magnitude.

FIG. 3 shows two such equalizers 218a, 218b of equalizer block 218, which are connected in series. Each applied a respective equalization filter according to a respective equalizer parameter set 306a, 306b generated and updated in real time tracking block 220. However, this is purely exemplary and more or fewer individual equalizer can be applied as appropriate to the current state of the system gain spectrum. That is, the number of equalizers can be changed dynamically based on the tracking.

FIGS. 4A and 4B show the magnitude and phase spectra for one such equalization filter, which applies a gain dip having a depth of −6 dB gain at a frequency fc (center frequency). The dip has a width at −3 dB gain of Δf, as shown. In this example, fc is ⅛ times the sample rate and the width Δf ¹⁄₃₂ times the sample rate of the microphone signal y(t).

The sample rate of the signal y(t) in Hz is defined as the number of samples per second. Note that FIGS. 4A and 4B show the normalized frequency with the sample rate normalized to 2, and thus the Nyquist frequency normalized to 1. Hence, fc is shown at a normalized frequency of 0.25. Also note the y-axis in FIGS. 4A use logarithmic scales.

Equation 1 is just an example of one suitable filter type, and the filter coefficients can be found e.g. by using bi-linear transformation filter design of a parametric description of the desired filter. However, different types of filter can be used—both parametric and non-parametric.

The above-described equalizer filters are of dip gain type, and are cascaded (i.e. the equalizer filters are applied in series), wherein for each of the equalizers the output is a weight between the input and the filtered output from the equalizer. This allows the effect of the equalization filter to be milder. Any delay in the filter can be accounted for by synchronization.

Figure 5:
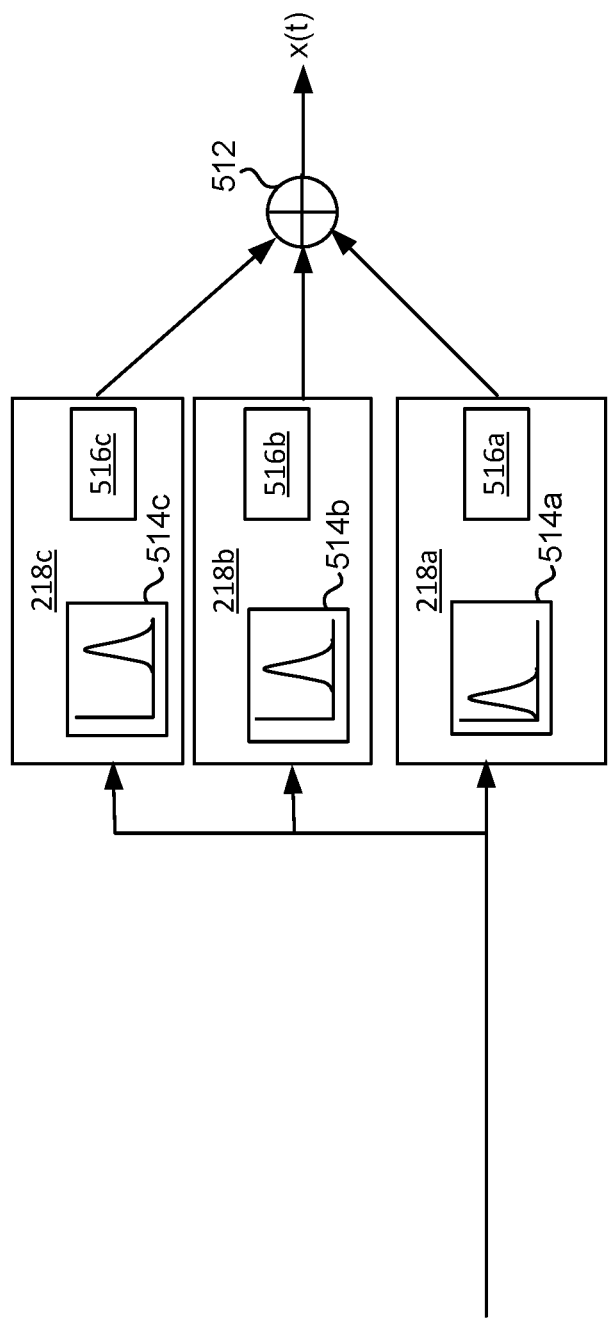
FIG. 5 shows a plurality of equalizer filters connected in parallel, applying respective equalizer filters in parallel.

Another possibility is the application of pass-band type equalizer filters, applied in parallel, whose outputs are scaled and added together. As example is shown in the functional block diagram of FIG. 5, which shows three equalizers 218a, 218b, 218c connected in parallel (this number is purely exemplary), each configured to apply in parallel a respective band pass filter 514a, 514b, 514c to a respective copy of the far end audio signal. The band pass-filtered versions are scaled, as denoted by respective scaling functions 616a, 516b, 516c of each equalizer 218a, 218b, 218c, and the scaled outputs combined, as denoted by summing function 512, to generate x(t). By reducing the overall level of the output of, say, the second equalizer 218b, the level of x(t) around the middle of the spectrum can be reduced. As will be apparent, having a greater number of parallel equalizers, each applying a narrower band pass provides a greater level of control.

In the example of FIG. 3, the equalizer block 218 is applied on the playout side (i.e. to the received signal x(t), before it is played out via the loudspeaker 204) and before the echo path (that is the reference signal is taken after equalization has been applied).

Alternatively, the equalizer block 218 can be applied in the echo path; that is, after the AEC takes its reference signal copy from the loudspeaker signal and before the echo is cancelled in the microphone signal y(t). In this case, the estimated echo path may be corrected as soon as the equalizer settings are modified, to immediately expect an echo path change from the change of the applied equalizer.

Applying the equalizer 218 on the playout side can potentially improve the playout signal x(t) when the equalizer reduces 218 the gain at resonating frequencies of the loudspeaker. This is also the case for resonating frequencies introduced by the room, as even though equalization is based on what is recorded by the microphone (due to the dependence of the system gain 215 on the echo path estimate 211), it is likely that the place of the listeners ears will be affected by the same resonances. However, this is not essential, and in general the equalizer 218 can be applied anywhere in the signal chain. For example all or part of the equalization can be applied at the near end device 104 to the microphone signal y(t) prior to transmission, in or after the echo path, or at the far end device 112.

As indicated, wherever it is applied in the signal chain, the equalization is applied continuously. In this context, "continuously" means over an interval of time, for the whole of the interval. For example, for the duration of a call or for part of a call. This interval can include both interval(s) of speech activity —i.e. when the near end user 102 is speaking in the case of the microphone signal y(t); when the far end user 112 is speaking in the case of the output signal x(t) —and interval(s) of speech inactivity —i.e. when the when the near end user 102 is not speaking for y(t); when the far end user 112 is not speaking for x(t). The interval of time may for example be the interval for which at least one peak in the system gain spectrum 215 remains above the gain threshold.

The real time signal processing described above may be performed on a per frame basis. Frames can, for example, be between 5 and 20 milliseconds in length and for the purpose of noise suppression be divided into spectral bins, for example, between 32 and 256 bins per frame. Each bin contains information about a signal component at a certain frequency, or in a certain frequency band. For dealing with wideband signals, the frequency range from 0 to 8 kHz is processed, divided into 64 or 32 frequency bands of equal width. It is not necessary that the bands are of equal width —they could for example be adjusted to better reflect the critical bands of the human hearing such as done by the Bark scale.

For speech in particular, each frame may be processed in real time and each frame receives an updated estimate of system gain for each frequency bin from system gain block 218. Thus each bin is processed using an estimate of system gain specific to that frame and the frequency of that bin. However, this is not essential and other types of real time processing are within the scope of this disclosure.

In this context, "real time" means that there is no perceptible delay in the equalizer 218 reacting to a change in the (actual) system gain. For example, the delay between a change in the actual system gain, for example caused by a movement of the device 104 that causes a change in the physical echo path, and the equalizer reacting may be about 20 milliseconds or less. This can be achieved by updating the estimated system gain spectrum 215 and the settings of the equalizer 218 every frame, though that is not essential. For example, in some cases, the equalizer settings may only be updated in response to a detection of a significant change in the system gain —this means that no updates may occur in an interval of more than, say, 20 ms if there are only small (negligible) changes in the system gain spectrum (e.g. changes in gain and/or peak frequency below respective thresholds) in that interval, but as soon as a substantially change occurs (e.g. above the threshold(s)) the equalizer filter(s) respond within, say, 20 ms or less.

A first aspect of the present subject matter is directed to a method of reducing acoustic feedback in an acoustic system comprising at least one audio device, the method comprising: generating an estimated system gain spectrum of the acoustic system, wherein the estimated system gain spectrum is updated in real-time to respond to changes in the acoustic system; tracking peak gains in the estimated system gain spectrum as the estimated system gain spectrum is updated in real-time; identifying based on the tracking at least one frequency at which the estimated system gain spectrum is currently exhibiting a peak gain; and based on said identification of the at least one frequency, controlling an audio equalizer to apply, to a first speech containing signal to be played out via an audio output device of the audio device and/or to a second speech containing signal received via an audio input device of the audio device, an equalization filter to reduce the level of that speech containing signal in a portion of its spectrum that includes the identified frequency, wherein the equalization filter is applied continuously throughout intervals of both speech activity and speech inactivity in that speech containing signal.

In embodiments, the estimated system gain spectrum may be generated by comparing the first speech containing signal with the second speech containing signal.

The method may comprise applying, to at least one of the speech containing signals, an echo cancellation process to attenuate an echo component of that signal created by an echo path in the acoustic system, whereby the equalization filter causes a reduction in the level of any residual echo component remaining in the first and/or the second signal in said portion of the spectrum.

Note this does not mean that the equalization has to be applied to the output of the echo canceller (though this is not excluded) —the equalizer can be applied before the echo canceller, and still result in a reduction in the level of the residual echo in the portion of the spectrum, relative to what its level would be in that portion of the spectrum without the equalizer. For example, echo cancellation can be applied to the microphone signal, and the equalizer can be applied to the signal before it is outputted by the loudspeaker, before or in the echo path of the echo canceller.

The estimated system gain spectrum may comprise an estimate of the echo path generated by the echo cancellation process.

The method may further comprise: receiving information about at least one signal processing process applied to at least one of the speech containing signals, and/or receiving information about acoustic conditions at another device, wherein the first speech containing signal is received at the audio device from the other device; wherein the received information may be used to generate the estimated system gain spectrum.

The at least one signal processing process may be applied at the audio device, or the other audio device, for example.

A plurality of audio equalizers may be applied in parallel, wherein each equalizer may apply a respective band pass equalizer filter to a version of the first and/or second signal; wherein the band pass-filtered versions may be scaled and combined to provide the speech signal having the reduced level in said portion of the spectrum, wherein said reduction may be achieved by adapting the scaling based on the tracking.

The method may be implemented by the audio device, for example by code executed on a processor of the audio device.

The equalizer may be a parametric equalizer, and the step of controlling the audio equalizer may comprise adjusting at least one parameter of the parametric equalizer based on the tracking to reduce the level of the speech containing signal in said portion of the spectrum.

That is, the controlling step may comprise performing parametric control of a pre-designed equalization filter(s). Note the scaling and the filtering can be applied in any order, or the scaling can be incorporated into the band pass filter itself.

The step of controlling the audio equalizer may comprise: generating at least one equalization parameter for reducing the level of an audio signal at the identified frequency, wherein the equalizer may apply the equalizer filter to the speech containing signal according to the equalization parameter, and thereby reduce the level of the speech containing signal in that portion of the spectrum.

The equalizer may be controlled based on the peak gain at the identified frequency and/or a width of a peak in the estimated system gain spectrum at the identified frequency.

The equalizer filter may have at least one dip, which may be centred on the identified frequency.

For example, the dip may have a depth that is determined based on the peak gain at the identified frequency and/or a width that is determined based on the width of the peak at the identified frequency.

The equalizer filter may be a bi-quad filter.

The identifying step may comprise identifying based on the tracking a plural number of the highest peak gains currently exhibited by the system gain spectrum, and the respective frequency of each of those peak gains; wherein that number of equalizer filters may be applied to the speech containing signal to reduce the level of the speech containing signal at those frequencies, each by a respective audio equalizer.

For example, N equalizers may reduce the level of the speech containing signal at each of those frequencies such that the reduced levels substantially match the level of the (N+1)th highest gain peak in the system gain spectrum.

Alternatively or in addition, the method may comprise identifying all of the peak gain(s) in the system gain spectrum that are current above a gain threshold, and the frequency of each of those peak gain(s); wherein a respective equalizer filter may be applied, by a respective audio equalizer, to the first and/or second speech containing signal to reduce the level of that speech containing signal, for each identified frequency, in a respective portion of the spectrum that includes that frequency.

The equalizer filters may reduce the level of the speech containing signal in each of the portions of the spectrum such that the reduced level(s) substantially match the gain threshold.

The equalization filter may be applied independently of any noise cancellation applied to the first and/or the second speech containing signal.

For example, noise cancellation may be applied to the first and/or the second noise signal independently of the equalizer filter and independently of the estimated system gain spectrum.

A second aspect of the present subject matter is directed to an audio signal processing device for use in an acoustic system, the device comprising: an audio output device; an audio input device; one or more processors; a memory accessible to the one or more processors, the memory configured to hold executable audio signal processing code, wherein the audio signal processing code is configured when executed by the one or more processors to cause operations of: generating an estimated system gain spectrum of the acoustic system, wherein the estimated system gain spectrum is updated in real-time to respond to changes in the acoustic system; tracking peak gains in the estimated system gain spectrum as the estimated system gain spectrum is updated in real-time; identifying based on the tracking at least one frequency at which the estimated system gain spectrum is currently exhibiting a peak gain; and based on said identification of the at least one frequency, controlling an audio equalizer to apply, to a first speech containing signal to be played out via the audio output device of and/or to a second speech containing signal received via the audio input device, an equalization filter to reduce the level of that speech containing signal in a portion of its spectrum that includes the identified frequency, wherein the equalization filter is applied continuously throughout intervals of both speech activity and speech inactivity in that speech containing signal.

In embodiments of the second aspect, the code may be further configured to implement any of the features of embodiments of the first aspect.

According to a third aspect of the present subject matter, a computer program product comprises executable code stored on a computer readable storage medium and configured when executed to implement any method of device/system functionality disclosed herein.

Generally, any of the functions described herein can be implemented using software, firmware, hardware (e.g., fixed logic circuitry), or a combination of these implementations. The terms "block", "module," "functionality," "component" and "logic" as used herein —such as the functional blocks of FIGS. 2 and 3 —generally represent software, firmware, hardware, or a combination thereof. In the case of a software implementation, the block, module, functionality, or logic represents program code that performs specified tasks when executed on a processor (e.g. CPU or CPUs). The program code can be stored in one or more computer readable memory devices. The features of the techniques described below are platform-independent, meaning that the techniques may be implemented on a variety of commercial computing platforms having a variety of processors.

For example, the user devices may also include an entity (e.g. software) that causes hardware of the user devices to perform operations, e.g., processors functional blocks, and so on. For example, the user devices may include a computer-readable medium that may be configured to maintain instructions that cause the user devices, and more particularly the operating system and associated hardware of the user devices to perform operations. Thus, the instructions function to configure the operating system and associated hardware to perform the operations and in this way result in transformation of the operating system and associated hardware to perform functions. The instructions may be provided by the computer-readable medium to the user devices through a variety of different configurations.

One such configuration of a computer-readable medium is signal bearing medium and thus is configured to transmit the instructions (e.g. as a carrier wave) to the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may us magnetic, optical, and other techniques to store instructions and other data.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method of reducing acoustic feedback in an acoustic system comprising at least one audio device, the method comprising:
   generating an estimated system gain spectrum of the acoustic system, wherein the estimated system gain spectrum is updated in real-time to respond to changes in the acoustic system;

tracking peak gains in the estimated system gain spectrum as the estimated system gain spectrum is updated in real-time;

identifying based on the tracking at least one frequency at which the estimated system gain spectrum is currently exhibiting a peak gain; and based on said identification of the at least one frequency, controlling an audio equalizer to apply, to one or more of a first speech containing signal to be played out via an audio output device of the audio device, or a second speech containing signal received via an audio input device of the audio device, an equalization filter to reduce the level of the one or more of the first speech containing signal or the second speech containing signal in a portion of its spectrum that includes the identified frequency, wherein the equalization filter is applied continuously throughout intervals of both speech activity and speech inactivity, and wherein speech inactivity pertains to a portion of the one or more of the first speech containing signal or the second speech containing signal that does not contain speech.

2. A method according to claim 1, wherein the estimated system gain spectrum is generated by comparing the first speech containing signal with the second speech containing signal.

3. A method according to claim 1, further comprising:
applying, to at least one of the speech containing signals, an echo cancellation process to attenuate an echo component of the at least one signal created by an echo path in the acoustic system, whereby the equalization filter causes a reduction in the level of any residual echo component remaining in one or more of the first speech containing signal or the second speech containing signal in said portion of the spectrum.

4. A method according to claim 3, wherein the estimated system gain spectrum comprises an estimate of the echo path generated by the echo cancellation process.

5. A method according to claim 1, further comprising:
receiving information about one or more of:
at least one signal processing process applied to at least one of the speech containing signals; or
acoustic conditions at another device, wherein the first speech containing signal is received at the audio device from the other device; and
wherein the received information is used to generate the estimated system gain spectrum.

6. A method according to claim 5, wherein the at least one signal processing process is applied at the audio device, or the other audio device.

7. A method according to claim 1, wherein a plurality of equalizers is applied in parallel, wherein each equalizer applies a respective band pass equalizer filter to a version of one or more of the first speech containing signal or the second speech containing signal;
wherein the band pass-filtered versions are scaled and combined to provide the speech signal having the reduced level in said portion of the spectrum, said reduction being achieved by adapting the scaling based on the tracking.

8. A method according to claim 1, wherein the method is implemented by the audio device.

9. A method according to claim 1, wherein the audio equalizer is a parametric equalizer and the step of controlling the audio equalizer comprises adjusting at least one parameter of the equalizer based on the tracking to reduce the level of the one or more of the first speech containing signal or the second speech containing signal in said portion of the spectrum.

10. A method according to claim 1, wherein the equalizer is controlled based on the peak gain at one or more of the identified frequency or a width of a peak in the estimated system gain spectrum at the identified frequency.

11. A method according to claim 1, wherein the equalizer filter has at least one dip, centered on the identified frequency.

12. A method according to claim 10, wherein the equalizer filter has at least one dip, centered on the identified frequency, wherein the dip has a depth that is determined based on one or more of the peak gain at the identified frequency or a width that is determined based on the width of the peak at the identified frequency.

13. A method according to claim 10, wherein the equalizer filter is a bi-quad filter.

14. A method according to claim 1,
wherein the identifying step comprises identifying based on the tracking a plural number of the highest peak gains currently exhibited by the system gain spectrum, and the respective frequency of each of those peak gains;
wherein that number of equalizer filters is applied to the speech containing signal to reduce the level of the speech containing signal at those frequencies, each by a respective audio equalizer.

15. A method according to claim 14, wherein N equalizers reduce the level of the speech containing signal at each of those frequencies such that the reduced levels substantially match the level of the (N+1)th highest gain peak in the system gain spectrum.

16. A method according to claim 1, comprising identifying all of the peak gain(s) in the system gain spectrum that are current above a gain threshold, and the frequency of each of those peak gain(s);
wherein a respective equalizer filter is applied, by a respective audio equalizer, to one or more of the first speech containing signal or the second speech containing signal to reduce the level of that speech containing signal, for each identified frequency, in a respective portion of the spectrum that includes that frequency.

17. A method according to claim 16, wherein the equalizer filters reduce the level of the speech containing signal in each of the portions of the spectrum such that the reduced level(s) substantially match the gain threshold.

18. A method according to claim 1, wherein the equalization filter is applied independently of any noise cancellation applied to one or more of the first speech containing signal or the second speech containing signal.

19. A computer-readable storage device storing executable code that is executable to perform operations comprising:
generating an estimated system gain spectrum of the acoustic system, wherein the estimated system gain spectrum is updated in real-time to respond to changes in the acoustic system;
tracking peak gains in the estimated system gain spectrum as the estimated system gain spectrum is updated in real-time;
identifying based on the tracking at least one frequency at which the estimated system gain spectrum is currently exhibiting a peak gain; and
based on said identification of the at least one frequency, controlling an audio equalizer to apply, to one or more of a first speech containing signal to be played out via an audio output device of the audio device, or a second speech containing signal received via an audio input device of the audio device, an equalization filter to reduce the level of the one or more of the first speech containing signal or the second speech containing signal in a portion of its spectrum that includes the identified frequency, wherein the equalization filter is applied continuously throughout intervals of both speech activity and speech inactivity, and wherein speech inactivity pertains to a portion of the one or more of the first speech containing signal or the second speech containing signal that does not contain speech.

20. An audio signal processing device for use in an acoustic system, the device comprising:

an audio output device;

an audio input device;

one or more processors;

a memory device accessible to the one or more processors, the memory device configured to hold executable audio signal processing code, wherein the audio signal processing code is configured when executed by the one or more processors to cause operations of:

generating an estimated system gain spectrum of the acoustic system, wherein the estimated system gain spectrum is updated in real-time to respond to changes in the acoustic system;

tracking peak gains in the estimated system gain spectrum as the estimated system gain spectrum is updated in real-time;

identifying based on the tracking at least one frequency at which the estimated system gain spectrum is currently exhibiting a peak gain;

and based on said identification of the at least one frequency, controlling an audio equalizer to apply, to one or more of a first speech containing signal to be played out via the audio output device, or a second speech containing signal received via the audio input device, an equalization filter to reduce the level of the one or more of the first speech containing signal or the second speech containing signal in a portion of its spectrum that includes the identified frequency, wherein the equalization filter is applied continuously throughout intervals of both speech activity and speech inactivity, and wherein speech inactivity pertains to a portion of the one or more of the first speech containing signal or the second speech containing signal that does not contain speech.

\* \* \* \* \*